United States Patent [19]

Bracamonte

[11] Patent Number: 4,758,078

[45] Date of Patent: Jul. 19, 1988

[54] PERISCOPING REAR AND SIDE VISION MIRROR ASSEMBLY FOR MOTOR VEHICLES

[76] Inventor: Raul V. Bracamonte, 9540 Melita St., Pico Rivera, Calif. 90660

[21] Appl. No.: 940,806

[22] Filed: Dec. 12, 1986

[51] Int. Cl.⁴ ............................ B60R 1/08; G02B 7/18
[52] U.S. Cl. .................................... 350/604; 350/637; 350/639
[58] Field of Search .............. 350/604, 637, 639, 606; 248/480, 476

[56] References Cited

U.S. PATENT DOCUMENTS

| | | | |
|---|---|---|---|
| 2,346,739 | 4/1944 | Ewing | 350/604 |
| 2,565,012 | 8/1951 | Barrett | 248/480 |
| 2,573,443 | 10/1951 | Holland | 248/480 |
| 2,607,273 | 8/1952 | Lark | 350/604 |
| 2,732,764 | 1/1956 | Parks | 248/480 |
| 4,363,534 | 12/1982 | Covert | 350/604 |

FOREIGN PATENT DOCUMENTS 1052 1/1985 Japan ................................. 350/639

Primary Examiner—Jon W. Henry
Attorney, Agent, or Firm—Edgar W. Averill, Jr.

[57] ABSTRACT

A periscoping rear vision mirror assembly for use on motor vehicles to assist the driver to see over adjacent or following objects such as parked vans, trucks and the like, or over wide trailer loads. The mirror assembly has a vertically extendable mast mounted in front of the front windshield of a motor vehicle. The mast is extendable or retractable and a mirror is affixed near the top of the mast. When the mast is extended, the driver may look over an adjacent object, which would otherwise obscure his view, and observe oncoming traffic or other features.

6 Claims, 1 Drawing Sheet

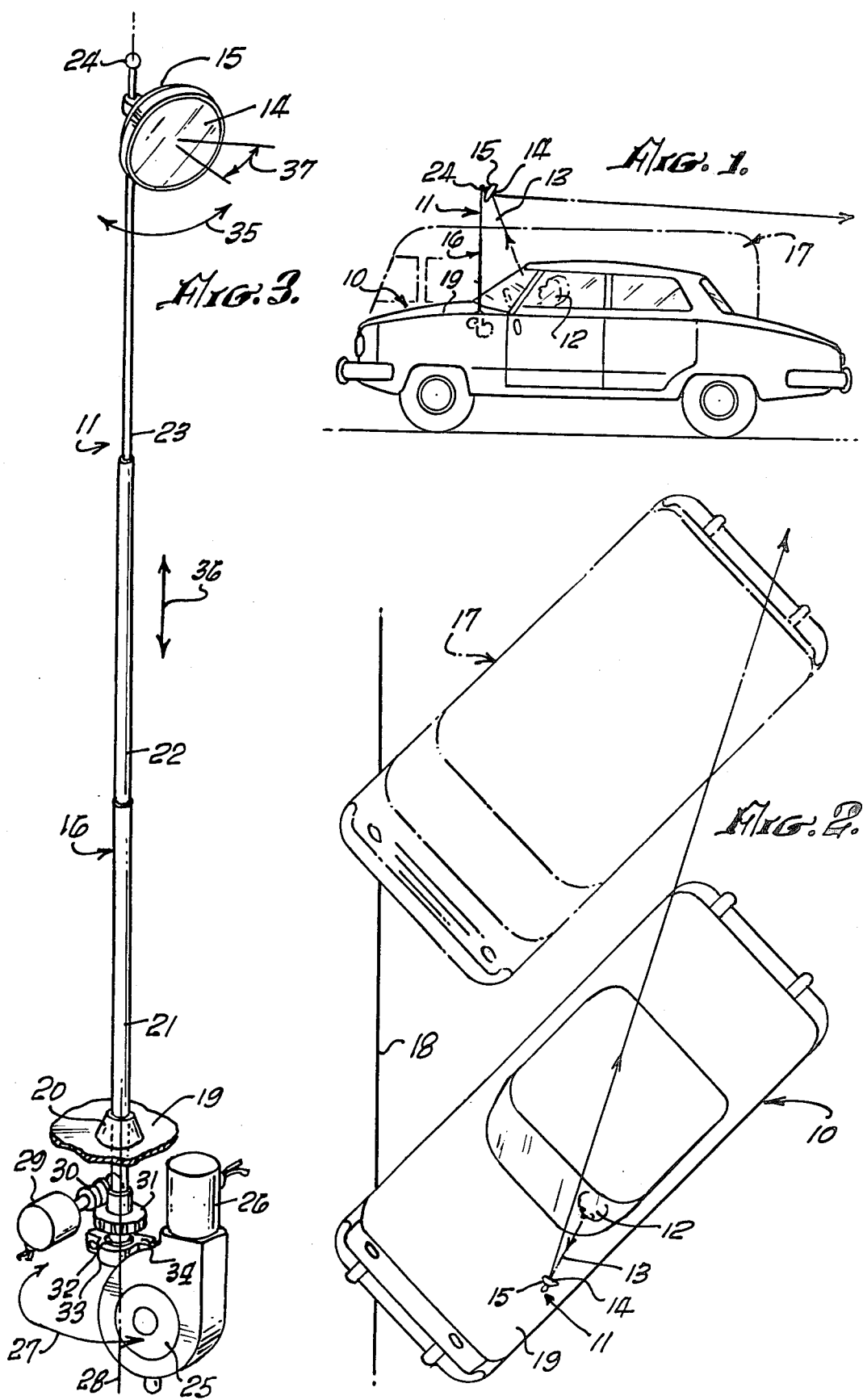

PERISCOPING REAR AND SIDE VISION MIRROR ASSEMBLY FOR MOTOR VEHICLES

BACKGROUND OF THE INVENTION

The field of the invention is motor vehicle accessories and the invention relates more specifically to rear vision mirrors used for motor vehicles.

Typically, rear vision mirrors are mounted near the base of the driver's window and are placed and adjusted to facilitate viewing behind the vehicle from a viewing line parallel to the side of the vehicle. Such mirrors are of no benefit in looking over an obstructing object. One common problem occurs in parallel parking on a street when one is parked adjacent a van, motor home or other obstructing vehicle. The driver then must trust to luck and the cooperation of drivers using the highway to back his vehicle onto the highway. Also, during occasions when the driver is towing a wide load such as a boat or wide trailer, the normal rear view obtained by the standard rear vision mirror can be obstructed.

SUMMARY OF THE INVENTION

It is, thus, an object of the present invention to provide a rear vision mirror assembly which is capable of providing a view over an obstructing object which is not possible with the standard rear vision mirror or by the unaided driver.

The present invention is for a periscoping rear vision mirror assembly for use on motor vehicles to assist the driver to see over adjacent objects such as parked vans, trucks or the like. The assembly includes a vertically extendable mast mounted in front of the front windshield of a motor vehicle. Means are provided for extending or retracting the mast. Mirror means are affixed near the top of the mast and the mirror means are adjustable to provide a view from the driver's seat over an adjacent obstruction when the mast is extended. Preferably, the periscoping mirror is remotely extended and lowered. Furthermore, means may be provided to remotely rotate the mirror through an arc of at least 45 degrees to assist the driver in viewing an area of interest. The mirror is preferably a convex mirror to increase the viewing angle.

BRIEF DESCRIPTION OF THE DRAWINGS

FIG. 1 is a side view of a motor vehicle including the periscoping rear vision mirror assembly of the present invention and also showing a parked van in phantom view.

FIG. 2 is a top view of the motor vehicle of FIG. 1 and an adjacent van.

FIG. 3 is a perspective view of the periscoping rear vision mirror assembly of the present invention.

DESCRIPTION OF THE PREFERRED EMBODIMENTS

A motor vehicle comprising an automobile 10 is shown in side view in FIG. 1 and includes a periscoping rear vision mirror assembly indicated generally by reference character 11. A driver 12 has a line of vision 13 which intersects a mirror 14. Mirror 14 is held in a housing 15 which, in turn, is held to a mast 16 described in more detail below. Mirror 14 reflects the driver's line of vision 13 along line 16 which permits the driver to view over an adjacent van 17 indicated in phantom lines in FIG. 1.

In those instances such as indicated in FIGS. 1 and 2 of the drawings, a driver is not able to view oncoming traffic when he is vertically parked against a curb 18. By use of the mirror assembly 11 of the present invention, the driver is enabled to look over van 17. In this way, he need not rely on the good nature of the users of the highway to safely back onto the highway from a parking place. This same problem exists if the automobile, or other motor vehicle, is pulling a wide trailer or other load. By telescoping the mirror of the mirror assembly 11, the driver is enabled to look over a wide load and safely view traffic behind.

One construction of the mirror assembly of the present invention is shown in FIG. 3 in perspective view. The top of the fender 19 of automobile 10 supports a guide 20 which is similar to that used with conventional telescoping antennas. Mast 16 has a stationary length 21, a first telescoping length 22 and a top telescoping length 23. The top of the mast is indicated by reference character 24. Mast 16 is telescoped in a conventional manner by the use of a flexible polymeric rod (not shown) which is wound on and off of a reel held in reel housing 25. A motor 26 is remotely controlled from within the vehicle.

Mirror assembly 11, as shown in the drawings, is also capable of rotational movement indicated by arrow 27 about an axis 28 which is generally vertical. This rotational movement is controlled by a remotely controlled motor 29 which turns a worm gear 30 which turns a driven gear 31 which is connected to stationary length 21. The term "stationary," as used herein, is intended to indicate vertical movement and not rotational movement. The assembly is held in a bearing 32 which, in turn, is held in a block 33 which includes a flange 34 which is secured to the vehicle.

Thus the operation of remotely controlled motor 29 from within the vehicle can bring about the rotation of the mirror as indicated by arrow 35.

Preferably, mirror 14 is a convex mirror which increases the field of view therefrom. Also, although the mirror assembly of FIG. 3 is shown as remotely controlled as to vertical movement 36 and as to rotational movement 35, a mirror may also be provided in a non-remotely controlled version. That is, when needed, the driver can exit the vehicle and raise and adjust the mirror by hand. The amount of rotation need not be a 360 degree rotation. It has been found, however, that the rotation should be at least 45 degrees, as shown by arrow 37, to permit viewing over obstructions on either side of the vehicle with a 60 degree movement being better and 90 degree movement providing full vision and being preferred. It is also contemplated that the mirror, itself, could be moved on the mast to provide an approximate positioning and the more detailed view could be brought about by the angular adjustment of the remotely controlled mirror. Also, the use of the remotely controlled mirror permits one to view different parts of the street or other areas of interest. Still further, it is advantageous that the mirror also be readily adjustable as to vertical field of vision.

While the mast 11, shown in the drawings, is a telescoping mast, it is also within the purview of the present invention that a solid mast be used as long as it is capable of being lowered and raised.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A periscoping rear vision mirror assembly for use on motor vehicles to assist the driver to see over adjacent objects such as parked vans or trucks, said assembly comprising:
   a vertically extendable mast mounted in front of the front windshield of motor vehicles;
   means for extending or retracting said mast;
   remotely actuated, motor-driven rotation means to enable the vertically extendable mast to be rotated through an angle of at least 45 degrees from within the vehicle; and
   mirror means affixed near the top of said mast, said mirror means being adjustable to provide a view from the driver's seat over an adjacent obstruction when the mast is extended.

2. The periscoping rear vision mirror assembly of claim 1 further including remotely actuated, motor-driven extension means to enable the vertically extendable mast to be extended and retracted from within the vehicle.

3. The periscoping rear vision mirror assembly of claim 1 wherein said mast is a telescoping mast.

4. The periscoping rear vision mirror assembly of claim 2 wherein said mast is a telescoping mast.

5. The periscoping rear vision mirror assembly of claim 1 wherein said mirror is convex.

6. A periscoping rear vision mirror assembly for use on motor vehicles to assist the driver to see over adjacent objects such as parked vans, trucks or the like, said assembly comprising:
   a remotely-controlled, vertically extendable mast mounted in front of the front windshield of a motor vehicle;
   remote control means for extending or retracting said mast;
   remotely-controlled mast rotation means, which mast rotation means move the mast through at least a 45 degree arc; and
   convex mirror means affixed near the top of said mast, said mirror means being adjustable to provide a view from the driver's seat over an adjacent obstruction.

* * * * *